United States Patent
Flynn

(10) Patent No.: US 11,378,221 B2
(45) Date of Patent: Jul. 5, 2022

(54) VAPOR RETARDER FOR INSULATED PIPE

(71) Applicant: Michael S. Flynn, Oxford, CT (US)

(72) Inventor: Michael S. Flynn, Oxford, CT (US)

(*) Notice: Subject to any disclaimer, the term of this patent is extended or adjusted under 35 U.S.C. 154(b) by 119 days.

(21) Appl. No.: 16/411,688

(22) Filed: May 14, 2019

(65) Prior Publication Data
US 2020/0363004 A1    Nov. 19, 2020

(51) Int. Cl.
| | |
|---|---|
| *B29C 65/00* | (2006.01) |
| *F16L 59/02* | (2006.01) |
| *B32B 38/10* | (2006.01) |
| *B32B 37/12* | (2006.01) |
| *B29C 65/50* | (2006.01) |

(52) U.S. Cl.
CPC ............ *F16L 59/022* (2013.01); *B32B 37/12* (2013.01); *B32B 38/10* (2013.01); *F16L 59/029* (2013.01); *B29C 65/50* (2013.01); *B29C 65/5042* (2013.01); *B29C 66/5223* (2013.01); *B29C 66/52231* (2013.01); *B29C 66/5326* (2013.01)

(58) Field of Classification Search
CPC . B29C 65/50; B29C 65/5042; B29C 66/5223; B29C 66/52231; B29C 66/5326; B32B 38/10; B32B 43/006; Y10T 156/1195; Y10F 156/1994
See application file for complete search history.

(56) References Cited

U.S. PATENT DOCUMENTS

| | | | | |
|---|---|---|---|---|
| 9,995,425 | B2* | 6/2018 | Bond | F16L 59/029 |
| 2004/0151922 | A1* | 8/2004 | Cohen | B32B 15/09 |
| | | | | 428/458 |
| 2009/0311456 | A1* | 12/2009 | Harris | B32B 5/022 |
| | | | | 428/36.1 |
| 2012/0037259 | A1* | 2/2012 | Shumate | B32B 7/12 |
| | | | | 138/149 |

* cited by examiner

*Primary Examiner* — Philip C Tucker
*Assistant Examiner* — Nickolas R Harm
(74) *Attorney, Agent, or Firm* — Leason Ellis LLP

(57) ABSTRACT

A vapor barrier and method for applying same around an insulated pipe structure is disclosed. The vapor barrier a vapor retarder layer, an adhesive layer disposed on one side of the vapor retarder layer, and a release layer covering the adhesive layer. The vapor barrier has a two-dimensional geometric profile which corresponds to a three-dimensional structure of a specific pipe joint. Applying the vapor barrier comprises removing first and second portions of the release layer to expose respective portions of the adhesive layer, adhering the respective portions of release layer to corresponding areas of the pipe joint, forming an overlap seal in which a portion of the vapor barrier is adhered to itself via a portion of the adhesive layer, and forming an edge seal in which a portion of the prefabricated vapor barrier is adhered to a portion of adjacent insulation structure via a portion of the adhesive layer.

2 Claims, 7 Drawing Sheets

VAPOR RETARDER FOR INSULATED PIPE

FIELD OF THE INVENTION

The present invention provides for a sheet-type or film-type water vapor retarder, and for pre-shaped vapor retarders for common pipe components.

BACKGROUND OF THE INVENTION

During building construction and/or remodeling, various pipes are installed in a building. These pipes can be used for various purposes such as cold-water supply, hot water supply, drainage (e.g., wastewater drainage), venting, HVAC, refrigeration lines, etc. Many of these pipes, especially cold water/refrigerated water pipes, require insulation to be installed around the pipes, for example, to prevent the formation of condensation on the pipes or to prevent heat gain and more generally to comply with energy codes.

In addition to the requirement of insulation, a vapor retarder (often referred to as a vapor barrier) is required to be placed about the pipe insulation to prevent permeation of water vapor through the insulation. Typically, a vapor barrier is required to be applied to the entire length of pipe, including pipe components such as elbows, tees, flanges, couplings, etc.

Applying a vapor barrier to a straight run of pipe or other conduit does not typically present any significant problems. Joints, however, are more complicated. Generally, the presently recommended procedure to provide a vapor barrier around joint requires the repeated application of mastic. This is a costly procedure at least because of the labor required for the applications, which includes drying time for each application. Quality assurance and performance consistency can also be issues.

One commercial product for providing a vapor barrier about these pipe components is a semi-rigid, plastic cover that has a 3-dimensional shape that approximates the 3-dimensional shape of the pipe component to be covered. One drawback of these 3-dimensional covers is that they are bulky in that they have a 3-dimensional shape and so shipping, storing, and transporting these covers becomes inefficient and costly. Another drawback is that forming 3-dimensional covers requires relatively complex 3-dimensional product forming machinery. Further, in order to apply the 3-dimensional covers, the covers have a split seam, which must separately be sealed (e.g., using a vapor tape or mastic paste)—a process that further increases the complexity and expense of the installation procedure.

The present invention provides a cost effective, time-, space-, and labor-saving improvement to existing methods for providing a vapor barrier around pipe joints, including insulated pipe structures and joints.

SUMMARY OF THE INVENTION

In accordance with a first aspect of the invention, a vapor barrier for a pipe joint in an insulated pipe structure comprises a prefabricated vapor barrier having a vapor retarder layer, an adhesive layer disposed on one side of the vapor retarder layer, and a release layer covering the adhesive layer. The prefabricated vapor barrier is sized and shaped and has a two dimensional geometric profile that corresponds to a specific pipe joint having a three dimensional structure such that the prefabricated vapor barrier is capable of being applied to the specific pipe joint via the removal of the release layer and adherence between the adhesive layer and the specific pipe joint to assume a three dimensional shape which corresponds to the specific pipe joint. In the applied condition, the prefabricated vapor barrier provides an overlap seal between at least two ends of the prefabricated vapor barrier in which a portion of the adhesive layer maintains the overlap seal and an edge seal in which a portion of the vapor barrier overlaps a portion of insulation structure adjacent the specific pipe joint and a portion of the adhesive layer maintains the edge seal between the prefabricated vapor barrier and the adjacent insulation structure.

In accordance with a further aspect of the invention, a method for applying a vapor barrier around an insulated pipe structure having a specific pipe joint having a three-dimensional structure is disclosed. A prefabricated vapor barrier having a vapor retarder layer, an adhesive layer disposed on one side of the vapor retarder layer, and a release layer covering the adhesive layer is selected, wherein the prefabricated vapor barrier is sized and shaped to have a two-dimensional geometric profile which corresponds to the three-dimensional structure of the specific pipe joint. A first portion of the release layer is removed to expose a first portion of the adhesive layer. That first portion of release layer is adhered to a corresponding area of the specific pipe joint. A second portion of the release layer is then removed to expose a second portion of the adhesive layer, and the second portion of release layer is adhered to a corresponding area of the specific pipe joint. At least one of the adhering steps includes forming an overlap seal in which a portion of the prefabricated vapor barrier is adhered to itself via a portion of the adhesive layer. Finally, an edge seal is formed in which a portion of the prefabricated vapor barrier is adhered to a portion of adjacent insulation structure via a portion of the adhesive layer.

In accordance with a more particular implementation, the foregoing method can further comprise removing a third portion of the release layer to expose a third portion of the adhesive layer and adhering the third portion of release layer to a corresponding area of the specific pipe joint. In this more particular implementation, the step of forming the overlap seal further comprises adhering the third portions of the adhesive layer to itself.

In accordance with a still more particular implementation, the step of forming the edge seal can further comprise adhering the third portions of the adhesive layer to adjacent insulation structure.

These and other features, aspects and details can be appreciated from the accompanying description of certain embodiments of the invention.

DETAILED DESCRIPTION CERTAIN OF EMBODIMENTS OF THE INVENTION

Figure 1B:
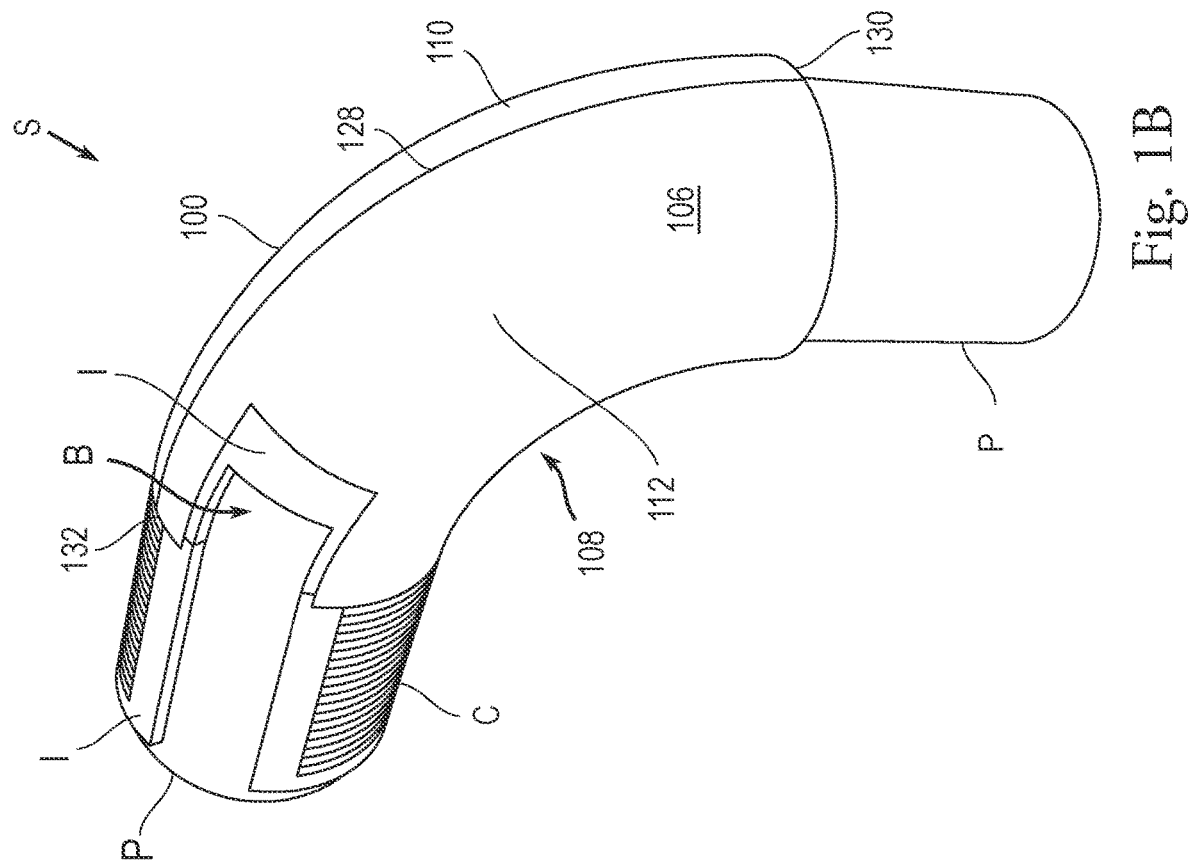
FIG. 1B shows the vapor barrier of FIG. 1A applied to a three-dimensional pipe structure.
Figure 1A:
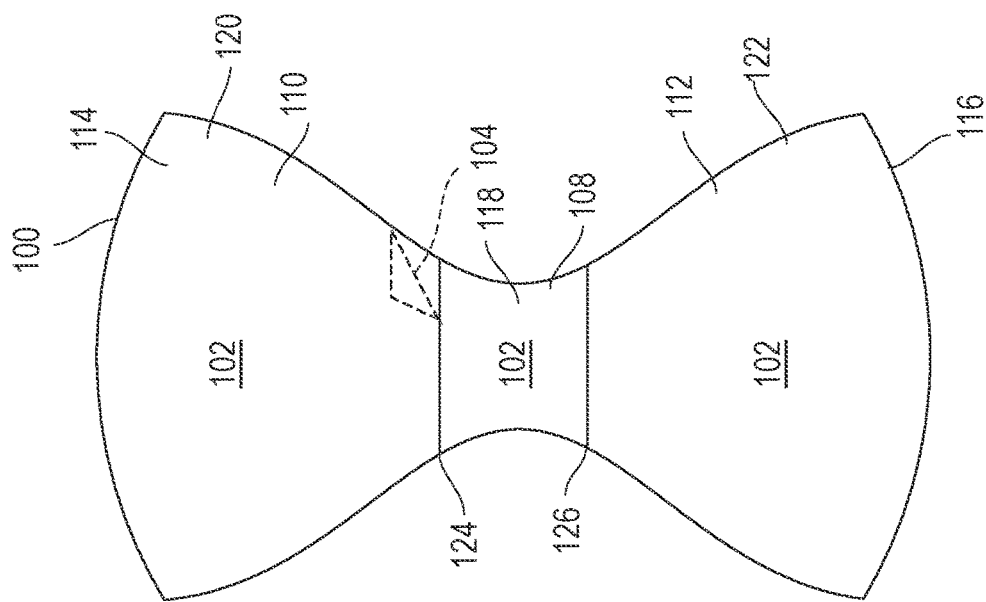
FIG. 1A shows a vapor barrier in accordance with one embodiment of the present invention shown in a two-dimensional configuration.
Figure 2B:
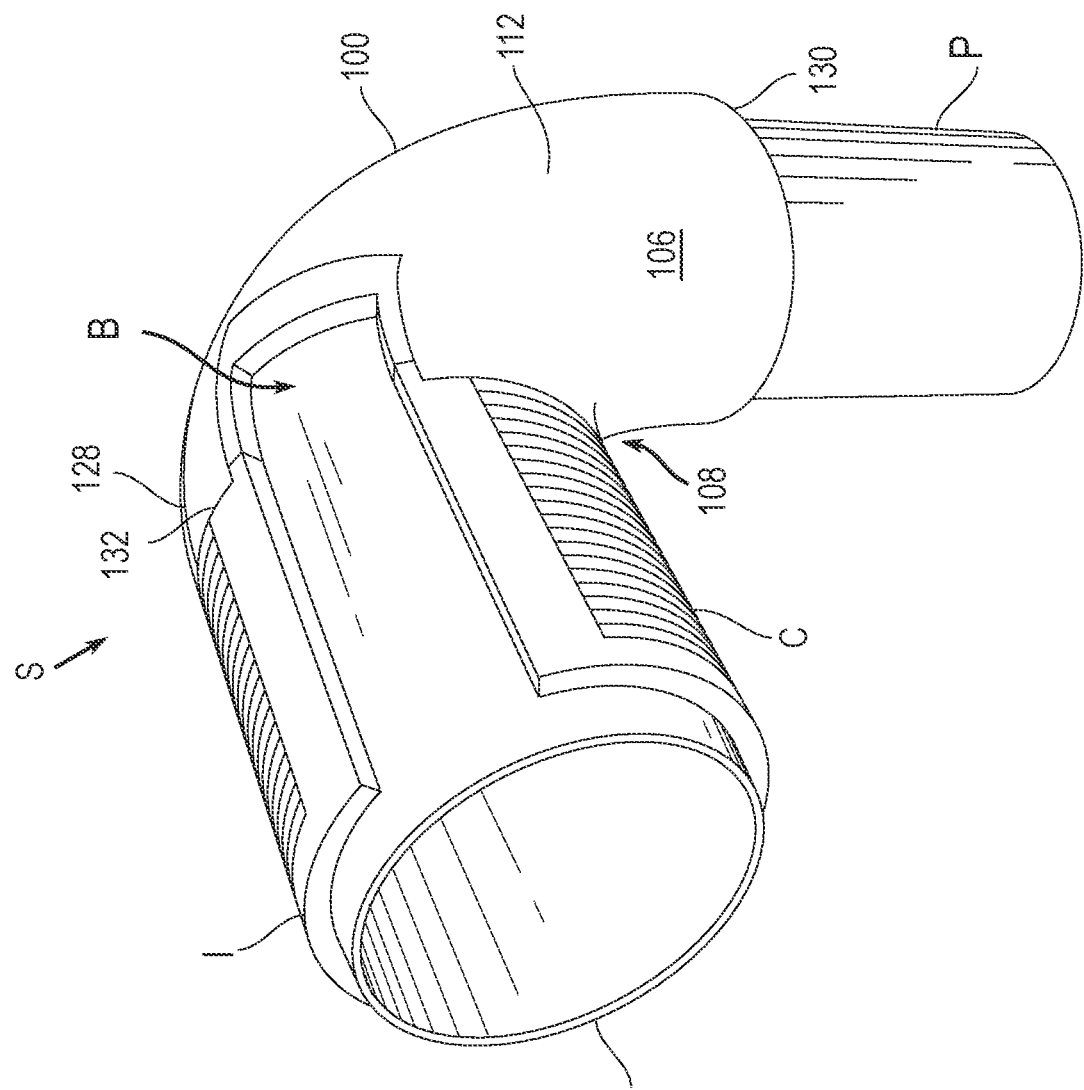
FIG. 2B shows another perspective view of FIG. 1B.
Figure 2A:
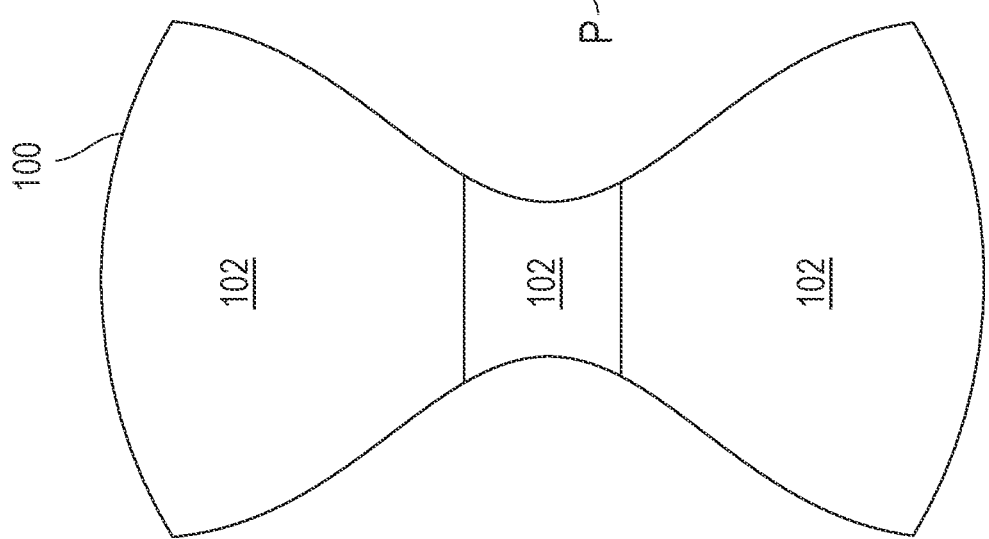
FIG. 2A shows the vapor barrier of FIG. 1A in a two-dimensional configuration.

Referring to FIGS. 1-2, a prefabricated vapor barrier sheet 100 is shown in a two-dimensional state and in a three-dimensional shape as applied to a pipe structure S that includes pipe P, porous thermal insulation I (e.g., fiberglass insulation) disposed about the pipe P, a vapor cover C disposed about the straight section of pipe P, and elbow B. Referring to FIGS. 1A and 2A, the vapor barrier sheet is shown in two-dimensional form, prior to application to the pipe. The two-dimensional vapor barrier 100 is applied to the three-dimensional pipe elbow B to assume a three-dimensional shape, as show in FIGS. 1B and 2B. The vapor barrier 100 is provided with a release layer 102. Below the release layer 102 is an adhesive layer 104 (see, e.g., FIG. 1A showing a portion of the release layer 102 pealed back to expose a portion of the adhesive layer 104). On the opposite side of the release layer 102 and adhesive layer 104 is the vapor retarder layer/outer cover layer 106. After removal of the release layer 102, vapor barrier 100 is applied to the pipe with the adhesive layer 104 facing toward the pipe structure (which includes the pipe, elbow, and insulation) and the outer cover layer 106 facing outwards. As such, the vapor barrier self-adheres to the pipe elbow, which is described in more detail below.

The vapor barrier 100 includes a waist 108, first and second wings 110, 112, and first and second ends 114, 116. The release layer 102 includes a first section 118 that covers the waist area 108, and second and third sections 120, 122 that cover the first and second wing areas 110, 112. The first section 118 of the release layer can be separated from the second and third sections 120, 122 by whisper cuts 124, 126. The whisper cuts 124, 126 provide a frangible seam along which one section of the release layer 102 can be removed. The frangible seams can be selected from various frangible seam types, such as, for example, a perforated seam, partial cut seam, creased seam, or full cut seam, etc. The release layer 102 is separated into separate sections in order to assist in the controlled application of the vapor barrier 100 to the pipe structure, as described in more detail below.

As one exemplary method of use and procedure of application of the vapor barrier 100 to the pipe structure, a user selects a vapor barrier that is appropriate for the pipe structure to which it is to be applied. For example, the prefabricated vapor barrier 100 can include indicia or other markings that indicate its suitable applications, which can include the size of the pipe, the type of joint, the thickness of insulation on the pipe and joint, among other factors. As shown in FIGS. 1-2, for example, the prefabricated vapor barrier 100 is suitable for the pipe structure to which it is applied (e.g., a 90-degree elbow as shown). The first section 118 of the release layer 104 is pealed back to expose the portion of the adhesive layer 104 underneath in the waist area 108. The first section 118 of the release layer is separated from the other two sections of release layer 120, 122 along the whisper cuts 124, 126. As such, only a portion of the adhesive layer 104 is exposed while the remainder of the adhesive layer remains covered by release layer sections 120, 122. By providing a controlled, section-by-section exposure of the adhesive layer 104, application of the vapor barrier 100 to the pipe structure is improved.

The now exposed waist area of the adhesive layer is applied to the inside curve of the elbow B. Once the exposed adhesive layer is pressed against the pipe structure in the area of the inside of the curve of the elbow, the vapor barrier 100 is now partially attached to the elbow. The partial attachment of the vapor barrier permits the user to free up hands for use in the further installation process. As such, with the vapor barrier 100 partially attached, the user can now focus on applying the wing sections 110, 112 to the pipe structure. A next section of release layer 120 is removed to expose the adhesive layer 104 in the area of one of the wings 110. The wing section 110 with the adhesive layer now exposed is applied to the pipe structure so that the wing 110 extends around the elbow B to the outer curve area of the elbow. The other section of release layer 122 is removed to expose the adhesive layer 104 in the area of the other wing 112. The other wing 112 is then applied to the other side of the pipe structure so that the wing 112 extends around the elbow B to the outer curve area of the elbow. The vapor barrier 100 is sized and shaped such that at an overlap seam 128 is formed when the vapor barrier is applied in which the edges 114, 116 of the wings 110, 112 overlap. The overlap configuration permits a vapor barrier-to-vapor barrier seal. As such, the overlap at the seam 128 helps to maintain the integrity of the vapor seal about the pipe structure. In addition, the vapor barrier 100 is sized and shaped so that when applied to the pipe structure, the vapor barrier 100 extends beyond the pipe elbow B to adjacent pipe sections (e.g., straight pipe sections P that include their own respective vapor covers C). As such, the vapor barrier 100 provides edge extension seals 130 and 132 that provide a seal between the vapor barrier 100 and adjacent vapor covers C on adjacent insulation structures. Accordingly, the edge seals 130 and 132 and the overlap seam seal 128 act to provide a continuous vapor seal from one pipe section, through the coupling (e.g., elbow B), to the next pipe section. The continuous vapor seal that is possible through the use of the prefabricated vapor barrier of the present invention provides for an easily installed, high performance vapor barrier product.

An application tool, such as, for example, a plastic applicator (also referred to as a squeegee) can be used to apply uniform pressure to the vapor barrier as it is being applied to the pipe structure to ensure that there is good contact and adhesion between the adhesive layer and the pipe structure and along the seam 128 and edge seals 130, 132.

Prefabricated vapor barriers having other geometries that correspond to other specific pipe joints, such as those discussed below, can be applied in a similar manner as discussed above in which the vapor barrier is applied in a section-by-section fashion (by controlled removal of sections of release layer) and in which overlap and edge seals are formed to provide a similar high performance vapor barrier product.

Figure 3:
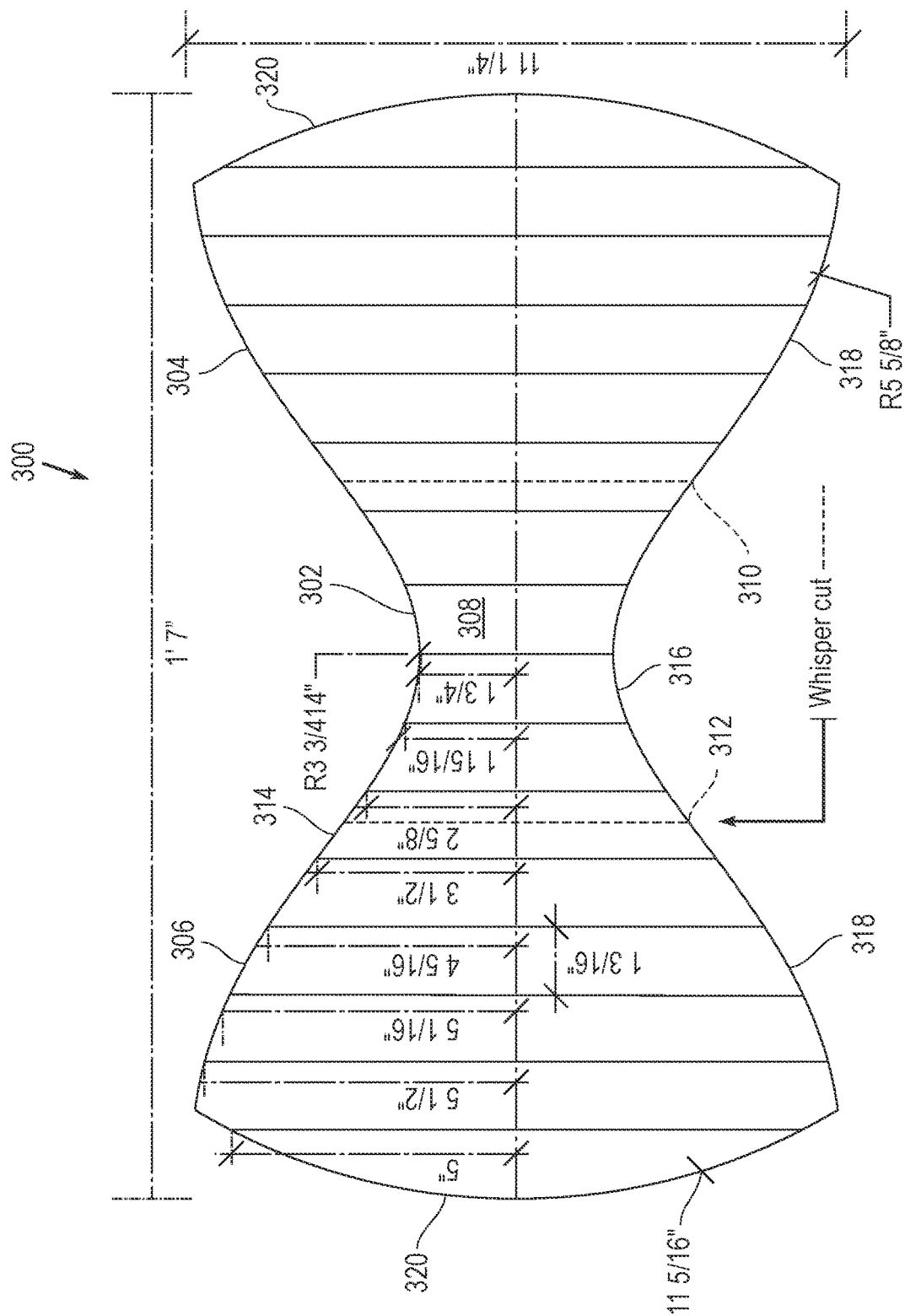
FIG. 3 shows a vapor barrier in accordance with another embodiment of the present invention shown in a two-dimensional configuration.

FIG. 3 shows a vapor barrier 300 that is prefabricated to provide a wrap for a 90-degree pipe elbow (similar to vapor barrier 100). The vapor barrier 300 has a middle section or waist 302 and two wings 304 and 306. The vapor barrier is illustrated having exemplary dimensions for application to an elbow of a particular size (e.g., 8-inch 90-degree pipe elbow). The dimensions are only exemplarily and can be increased or decreased to accommodate various pipe sizes while maintaining the overall proportional geometry for application to a 90-degree pipe elbow. The vapor barrier 300 includes a release layer 308 divided into three sections by whisper cuts 310, 312. The side edges 314 of the vapor barrier transition from a concave curve section 316 to a convex curve section 318. The outer edges 320 have a convex curve profile. The vapor barrier 300 is sized and shaped so that a vapor barrier-to-vapor barrier seam is formed and edge seals between the vapor barrier 300 and adjacent vapor covers are formed so that a continuous vapor seal is maintained through the coupling.

Figure 4:
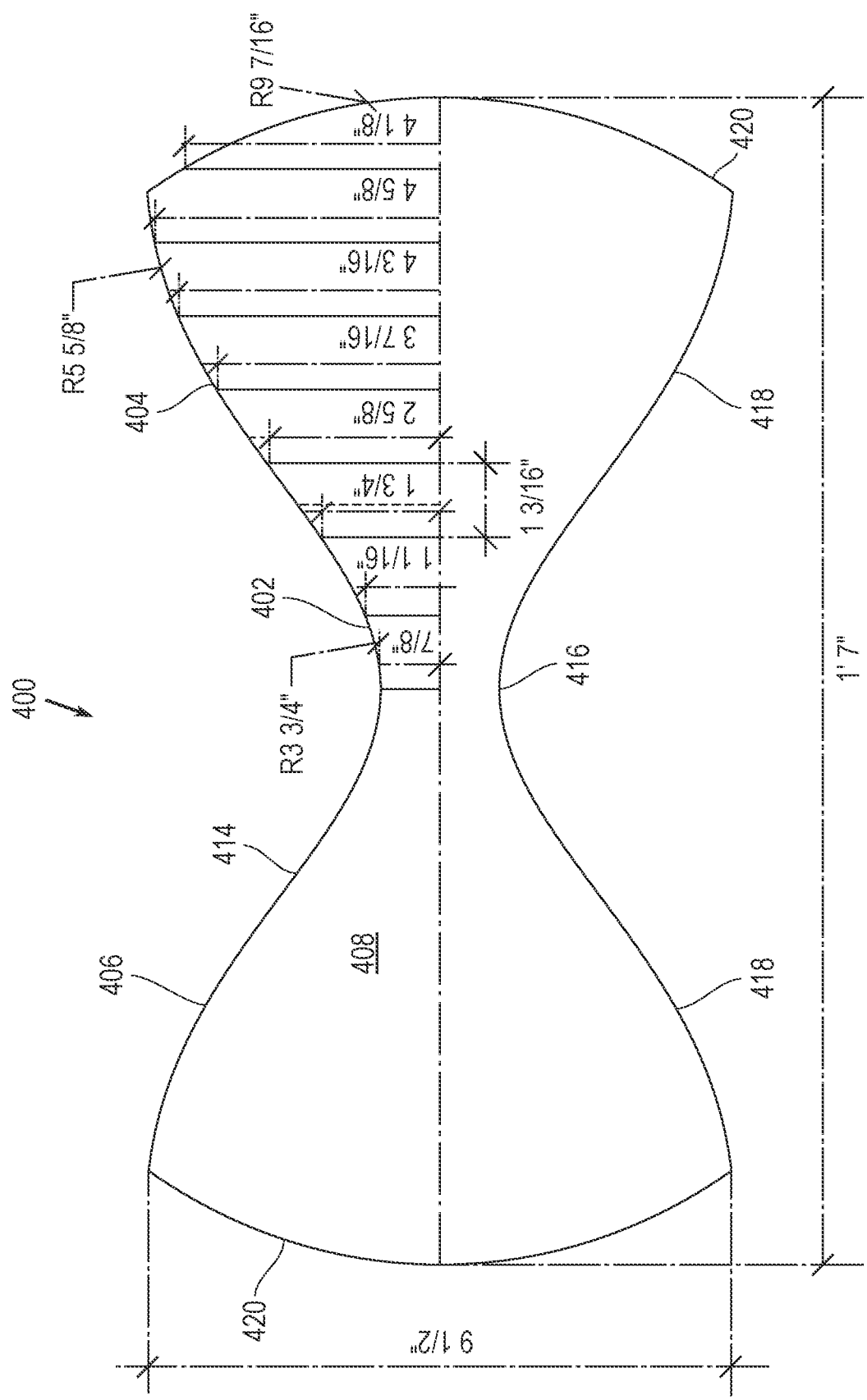
FIG. 4 shows a vapor barrier in accordance with another embodiment of the present invention shown in a two-dimensional configuration.

FIG. 4 shows a vapor barrier 400 that is prefabricated to provide a wrap for a 45-degree pipe elbow. The vapor barrier 400 has a middle section 402 and two wings 404 and 406. The vapor barrier 400 is illustrated having exemplary dimensions for application to an elbow of a particular size (e.g., 8-inch 45-degree pipe elbow). The dimensions are only exemplarily and can be increased or decreased to accommodate various pipe sizes while maintaining the overall proportional geometry for application to a 45-degree pipe elbow. The vapor barrier 400 includes a release layer 408 which can be divided into sections by whisper cuts (not shown). The side edges 414 of the vapor barrier transition from a concave curve section 416 to a convex curve section 418. The outer edges 420 have a convex curve profile. The vapor barrier 400 is sized and shaped so that a vapor barrier-to-vapor barrier seam is formed and edge seals between the vapor barrier 400 and adjacent vapor covers are formed so that a continuous vapor seal is maintained through the coupling.

Figure 5:
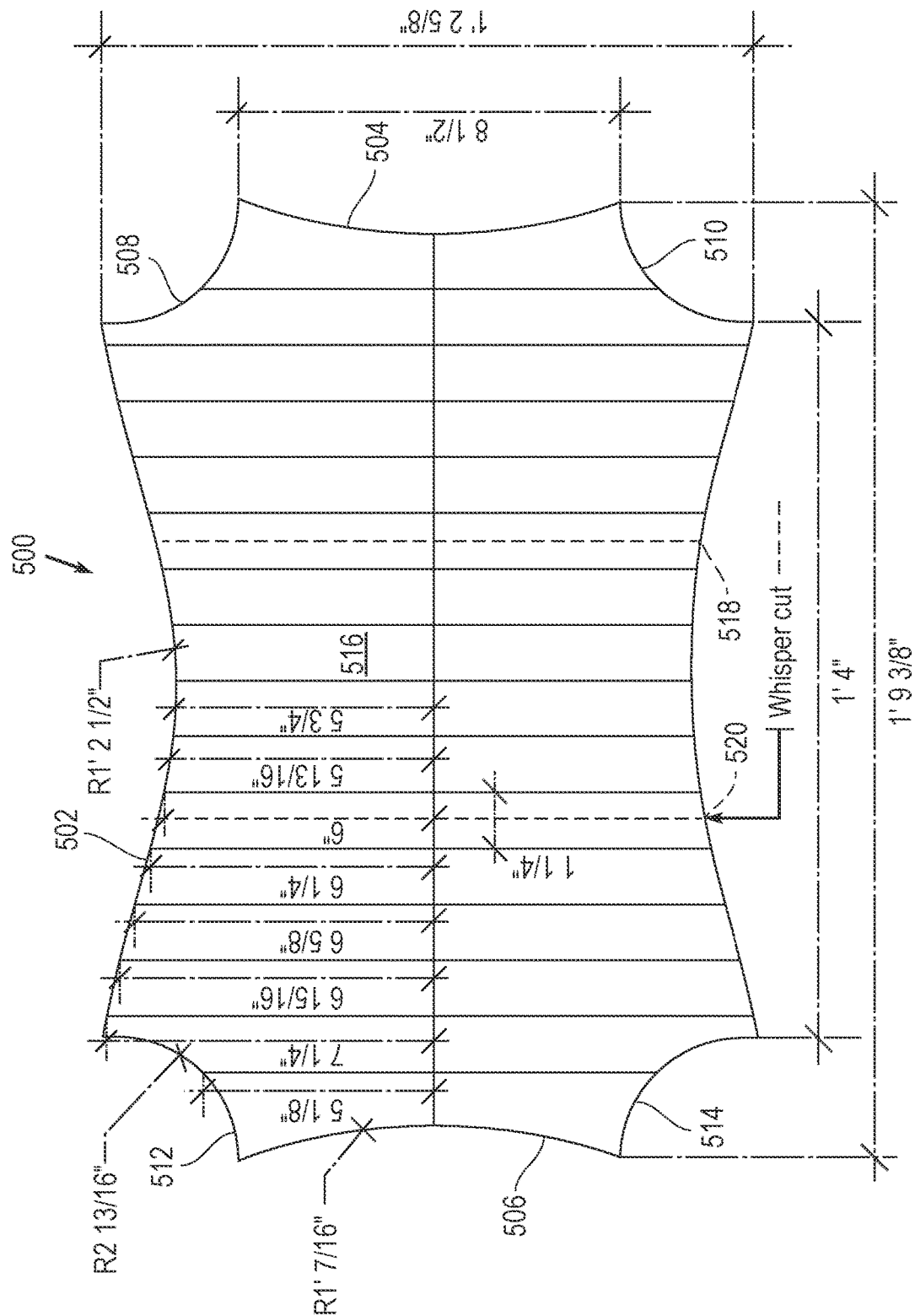
FIG. 5 shows a vapor barrier in accordance with another embodiment of the present invention shown in a two-dimensional configuration.

FIG. 5 shows a vapor barrier 500 that is prefabricated to provide a wrap for a 90-degree equal pipe tee. The vapor barrier 500 has a middle section 502 and two wings 504 and 506, and four corner sections 508, 510, 512, and 514. The vapor barrier 500 is illustrated having exemplary dimensions for application to a tee fitting of a particular size (e.g., 8 inch 90 degree pipe tee), while it can be appreciated by persons of skill in the art that the other embodiments described herein illustrate that a given vapor barrier can be constructed in accordance with this disclosure to have segments optimized for adherence around a particular fitting type and size, so as to encase pipe segments and insulation in a vapor retarding (blocking) manner. The dimensions are only exemplarily and can be increased or decreased to accommodate various pipe sizes while maintaining the overall proportional geometry for application to a 90-degree pipe tee. The vapor barrier 500 includes a release layer 516 divided into three sections by whisper cuts 518, 520. The vapor barrier 500 is sized and shaped so that a vapor barrier-to-vapor barrier seam is formed and edge seals between the vapor barrier 500 and adjacent vapor covers are formed so that a continuous vapor seal is maintained through the coupling.

Figure 6:
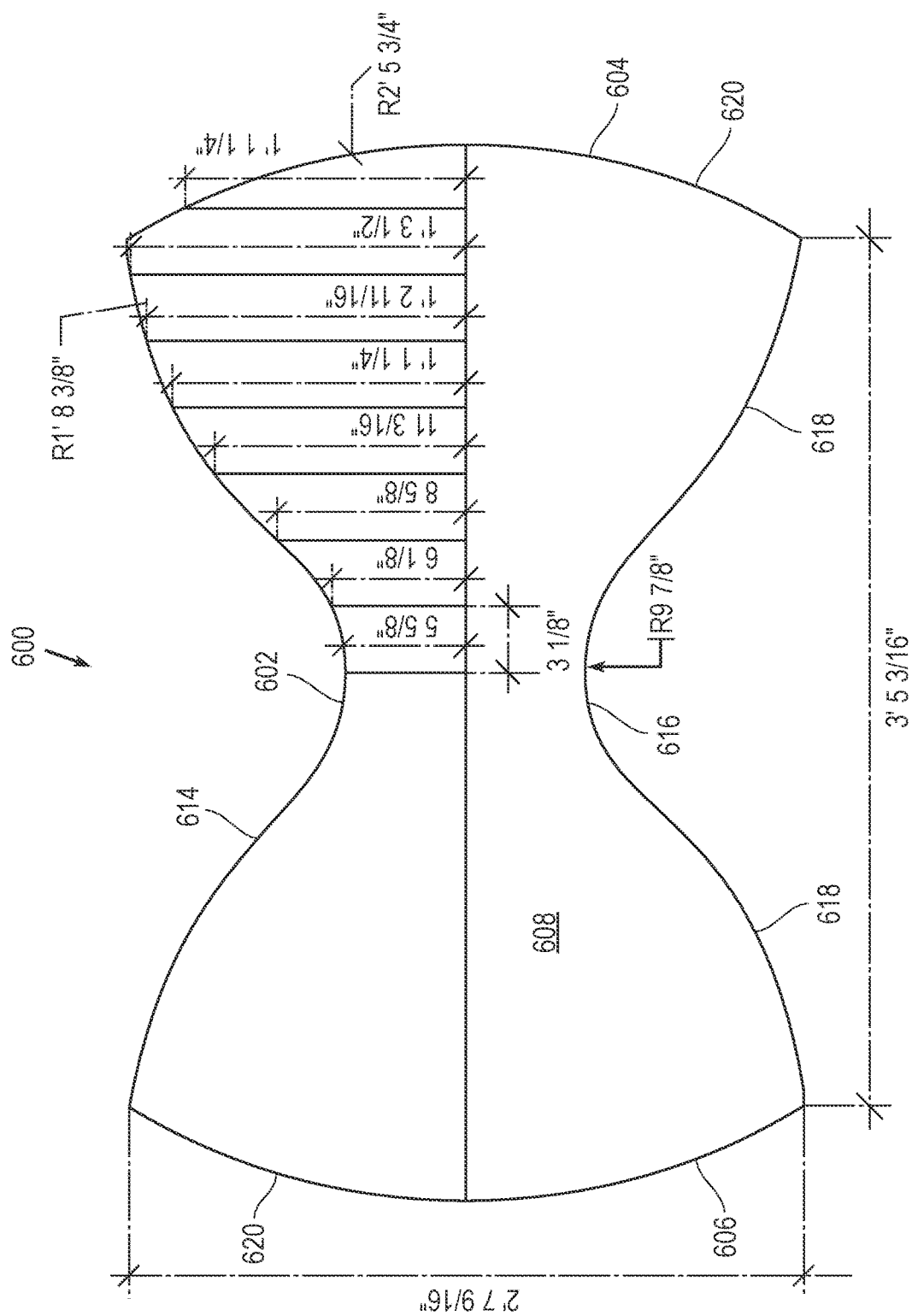
FIG. 6 shows a vapor barrier in accordance with another embodiment of the present invention shown in a two-dimensional configuration.

FIG. 6 shows a vapor barrier 600 that is prefabricated to provide a wrap for a 90-degree pipe elbow for a Victaulic-type joint. The vapor barrier 600 has a middle section 602 and two wings 604 and 606. The vapor barrier is illustrated having exemplary dimensions for application to an elbow of a particular size (e.g., 8-inch 90-degree pipe elbow for a Victaulic-type joint). The dimensions are only exemplarily and can be increased or decreased to accommodate various pipe sizes while maintaining the overall proportional geometry for application to a 90-degree pipe elbow with Victaulic-type joints. The vapor barrier 600 includes a release layer 608 that can be divided into sections by whisper cuts (not shown). The side edges 614 of the vapor barrier transition from a concave curve section 616 to a convex curve section 618. The outer edges 620 have a convex curve profile. As can be seen in a comparison between the vapor barrier 300, which is prefabricated for application to a standard 90-degree elbow, and vapor barrier 600, which is prefabricated for application to a Victaulic-type 90-degree elbow, vapor barrier 600 has a different geometric profile to accommodate the Victaulic-type configuration (e.g., comparatively thicker wing sections). The vapor barrier 600 is sized and shaped so that a vapor barrier-to-vapor barrier seam is formed and edge seals between the vapor barrier 600 and adjacent vapor covers are formed so that a continuous vapor seal is maintained through the coupling.

Figure 7:
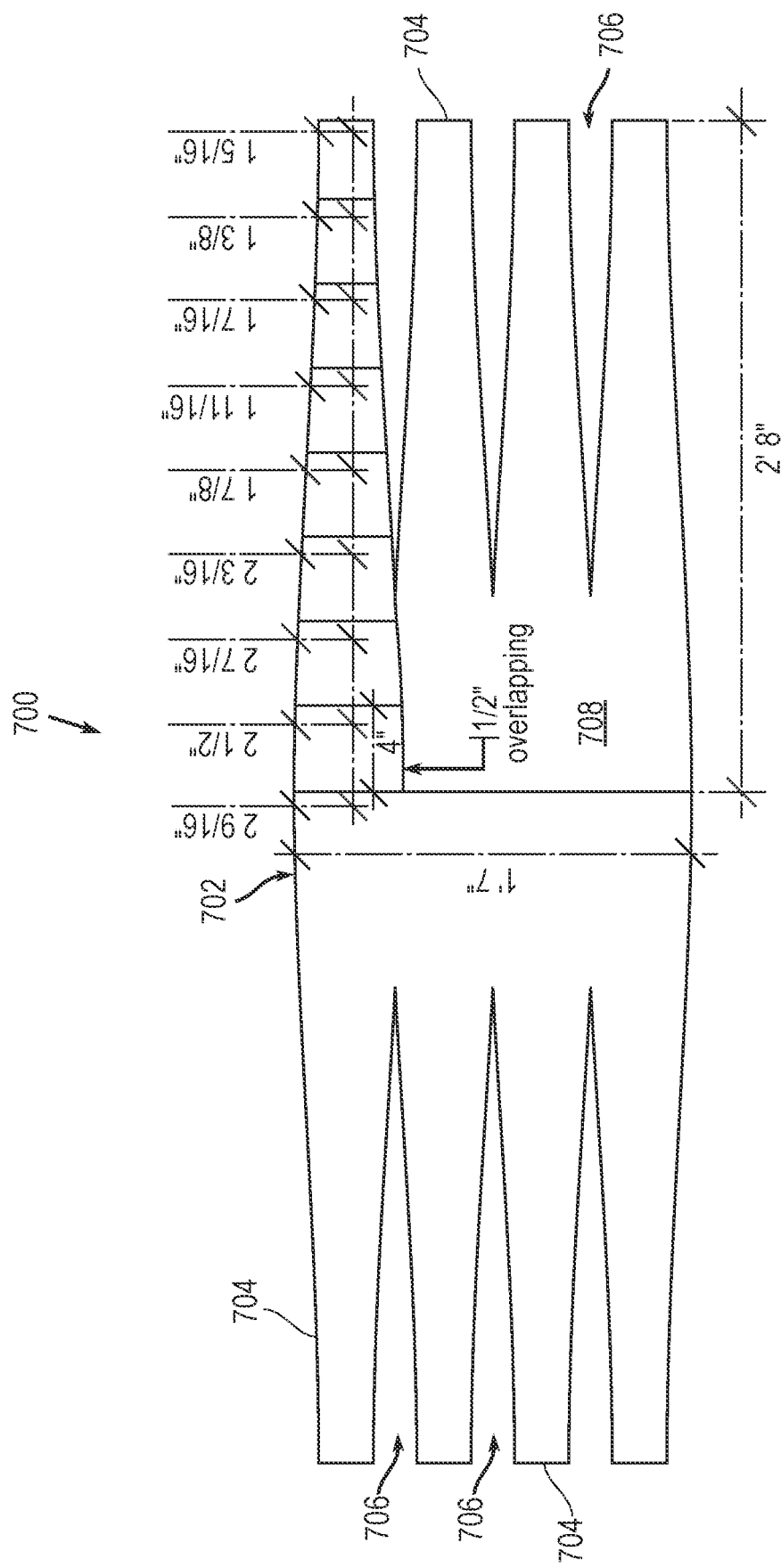
FIG. 7 shows a vapor barrier in accordance with another embodiment of the present invention shown in a two-dimensional configuration.

FIG. 7 shows a vapor barrier 700 that is prefabricated to provide a wrap for a 90 degree "long sweep" pipe elbow. The long sweep elbow can be constructed of a long curve elbow or a 90-degree turn constructed by using two 45-degree elbow to achieve a 90-degree turn in the pipe. The vapor barrier 700 has a middle section 702 and a plurality of fingers 704. In between the fingers 704 are a plurality of relief cuts 706 that permit the fingers to be applied to the inside curve of the elbow while avoiding excessive creasing of the material. The fingers 704 are sized and shaped so that adjacent fingers at least partially overlap to provide a continuous vapor seal. As an alternative to relieve cuts 706, creases can be formed in the material so that the material can be folded to form pleats as the vapor barrier 700 is converted from its two-dimensional state to its three-dimensional state as applied to the pipe structure. The vapor barrier is illustrated having exemplary dimensions for application to an elbow of a particular size (e.g., 8-inch 90-degree long sweep pipe elbow). The dimensions are only exemplarily and can be increased or decreased to accommodate various pipe sizes while maintaining the overall proportional geometry for application to a 90-degree long sweep pipe elbow. The vapor barrier 700 includes a release layer 708 that can be divided into sections by whisper cuts (not shown). The vapor barrier 700 is sized and shaped so that a vapor barrier-to-vapor barrier seam is formed and edge seals between the vapor barrier 700 and adjacent vapor covers are formed so that a continuous vapor seal is maintained through the coupling.

The above described vapor barrier can be prefabricated from two dimensional sheets of material that has low vapor permeance ratings. For example, the vapor barrier can have a vapor retarding layer formed from a thin laminate, such as a poly-aluminum foil-poly sheet, or a thin homogenous film, such as a poly-vinylidene chloride (PVdC) film. These films can have a low water vapor permeance. These films can achieve a low vapor permeance of less than or equal to about 0.02 perm. The permeance characteristics of the vapor retarder layer can be adjusted as required for the specific environmental conditions and/or performance parameters required for a particular application. The outer side 106 of the vapor barrier is also water repellant/water resistant. An adhesive layer 104 is provided on one side of the retarder layer, which can be a pressure sensitive adhesive, for example. A removable release layer 102 can be applied to the adhesive layer to prevent premature adhesion. The vapor barrier can be prefabricated from this composite sheet material using two dimensional geometries such that when the prefabricated vapor barrier is applied to a corresponding three-dimensional pipe structure the vapor barrier can assume a three-dimensional shape while providing a continuous vapor seal across the pipe structure including the complex, three dimensional profiles associated with a pipe joint. The continuous vapor seal provided by the present invention can be provided through the transition seams such that a 0.02 vapor permeance can be maintained as per ASTM E96 combined with ASTM C1809, for example.

As can be seen from the forgoing, the present invention provides an improved device and method for installing insulation structures on pipes which require application of a vapor barrier to provide a continuous vapor seal.

Notably, the figures and examples above are not meant to limit the scope of the present application to a single implementation, as other implementations are possible by way of interchange of some or all of the described or illustrated elements. Moreover, where certain elements of the present application can be partially or fully implemented using known components, only those portions of such known components that are necessary for an understanding of the present application are described, and detailed descriptions of other portions of such known components are omitted so as not to obscure the application. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present application encompasses present and future known equivalents to the known components referred to herein by way of illustration.

The foregoing description of the specific implementations will so fully reveal the general nature of the application that others can, by applying knowledge within the skill of the relevant art(s) (including the contents of the documents cited and incorporated by reference herein), readily modify and/or adapt for various applications such specific implementations, without undue experimentation, without departing from the general concept of the present application. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings are shown accordingly to one example and other dimensions can be used without departing from the invention.

While various implementations of the present application have been described above, it should be understood that they have been presented by way of example, and not limitation. It would be apparent to one skilled in the relevant art(s) that various changes in form and detail could be made therein without departing from the spirit and scope of the application. Thus, the present application and invention disclosure should not be limited by any of the above-described example implementations, but rather is defined by the claims which follow and equivalents of the features recited therein.

I claim:

1. A method for applying a vapor barrier around an insulated pipe structure having a specific pipe joint having a three-dimensional structure, comprising:
    selecting a prefabricated vapor barrier having a vapor retarder layer, an adhesive layer disposed on one side of the vapor retarder layer, and a release layer covering the adhesive layer, wherein the prefabricated vapor barrier is sized and shaped to have a two-dimensional geometric profile with at least one portion having a same size and shape as at least one corresponding area on an outer surface of the three-dimensional structure of the specific pipe joint when the prefabricated vapor barrier is adhered to the specific pipe joint;
    removing a first portion of the release layer to expose a first portion of the adhesive layer;
    adhering the first portion of the adhesive layer to a first corresponding area on the outer surface of the specific pipe joint;
    removing a second portion of the release layer to expose a second portion of the adhesive layer;
    adhering the second portion of the adhesive layer to a second corresponding area on the outer surface of the specific pipe joint;
    forming an overlap seal in which a first portion of the prefabricated vapor barrier is adhered to itself via a third portion of the adhesive layer; and
    forming an edge seal in which a second portion of the prefabricated vapor barrier is adhered to a portion of adjacent insulation structure via one or more of the first, second, and third portions of the adhesive layer.

2. The method for applying a vapor barrier around an insulated pipe structure having a specific pipe joint having a three-dimensional structure according to claim 1, further comprising:
    removing a third portion of the release layer to expose the third portion of the adhesive layer; and
    adhering the third portion of the adhesive layer to a third corresponding area on the outer surface of the specific pipe joint;
    wherein the step of forming the overlap seal further comprises adhering the third portions of the adhesive layer to itself.

* * * * *